United States Patent [19]

Kotwicki

[11] 3,789,199

[45] Jan. 29, 1974

[54] SIGNAL MODE CONVERTER AND PROCESSOR

[75] Inventor: Allan Joseph Kotwicki, Detroit, Mich.

[73] Assignee: Bell Telephone Laboratories, Incorporated, Murray Hill, N.J.

[22] Filed: May 1, 1972

[21] Appl. No.: 249,383

[52] U.S. Cl. ........ 235/150.5, 235/152, 340/347 AD, 444/1, 340/347 AD;347 SH;172.5

[51] Int. Cl. ............................................... G06j 1/00

[58] Field of Search. 235/150.5, 152; 328/167, 151; 333/18, 28, 70 T; 444/1

[56] References Cited

UNITED STATES PATENTS

| | | | |
|---|---|---|---|
| 3,441,720 | 4/1969 | Lazecki | 235/150.5 |
| 3,173,349 | 4/1965 | Zaborsky et al. | 235/152 |
| 3,314,015 | 4/1967 | Simone | 333/18 X |
| 3,452,297 | 6/1969 | Kelly et al. | 235/150.5 X |
| 3,521,170 | 7/1970 | Leuthold et al. | 340/347 X |
| 3,639,739 | 2/1972 | Golden et al. | 328/167 X |

*Primary Examiner*—Joseph F. Ruggiero
*Attorney, Agent, or Firm*—C. S. Phelan

[57] ABSTRACT

An analog signal comparator is coupled to provide its output to a data processor which has digital outputs coupled through a digital-to-analog converter to an input of the comparator, for periodically producing in the processor digital representations of samples of another analog signal that is also applied to the comparator. In each sampling period, additional data processing is carried out with respect to the digital representations; and an output circuit coupled to the converter output employs a filter circuit to select only the results of the last-mentioned processing. The additional processing is shown for digital filters featuring single and tandem sections.

8 Claims, 10 Drawing Figures

ANALOG-TO-DIGITAL CONVERSION

MULTIPLICATION

SIGNAL MODE CONVERTER AND PROCESSOR

BACKGROUND OF THE INVENTION

1. Field of the Invention

This invention relates to signal processing circuits, and particularly to those circuits wherein signals are converted from one mode to another for processing and then reconverted for further utilization.

2. Description of the Prior Art

It is known in the art to convert between signal representation modes to change the mode from one, which is convenient for one purpose, to a mode which is convenient for another purpose. For example, electric signals are often transmitted in analog form, converted to corresponding digital form, stored or processed, and then reconverted to the analog form for further utilization. Separate circuit arrangements are usually employed for each function. There have been some systems wherein a limited number of circuit elements have been switched from one signal mode converter connection configuration to another to be timed shared by the mode converter circuits for reducing the overall system equipment expense to some extent. However, the tandem character of the operations has been retained in that each active circuit performs its own operations substantially independently of the performance of any other active circuit in a real time sense. That is, each active circuit is restricted only by the sampling period duration to be sure that it completes its operation in time to supply the next stage with new information in the next sampling time. Passive circuit elements can thus be switched to be time shared in some cases by more than one active circuit. However, active computer circuits employed for the storage or processing function are generally fully occupied with that and with tbe job of controlling the circuit element switching functions. Consequently, two relatively expensive sets of equipment still are required for analog-to-digital conversion logic and for the computer, respectively.

Digital filtering is one function that is in increasing demand and which often is required to work between signal mode converters. However, the complexity of the processing operations required has resulted in a great deal of digital filter simulation and very little practical construction of hardware capable of performing the digital filtering function per se on a real-time basis.

It is, therefore, one object of the present invention to simplify signal mode converting and processing circuits.

Another object is to facilitate the performance of complex digital processing functions on a real-time basis.

A further object is to combine at least a portion of the signal mode conversion functions and the additional digital processing functions into one circuit.

An additional object is to facilitate the performance of digital filtering operations on analog signals.

SUMMARY OF THE INVENTION

In an illustrative embodiment of the invention, an analog signal comparator is coupled to provide its output to a data processor having digital outputs which are coupled through a digital-to-analog converter to an input of the comparator for periodically producing in the processor digital representations of samples of another analog signal that is applied to another input of the comparator.

It is one feature of the invention that, by suitably programming the processor, other digital processing functions, in addition to the conversion of analog signals to digital form, are performed in each sampling period with respect to the digital signal representation.

It is another feature that the parts of each sampling period in which each of plural processing functions are performed are of unequal length, and an output is derived through a filter from the digital-to-analog converter output for discriminating against the processor output in a selectable part of such interval.

Yet another feature is that a parallel cellular logic processor is employed for the digital processing functions and is programmed so that the processor functions include both the analog-to-digital conversion and active digital filtering in the same program flow for the processor.

BRIEF DESCRIPTION OF THE DRAWING

A more complete understanding of the invention and its various features, objects and advantages may be obtained from a consideration of the following detailed description in connection with the appended claims and the attached drawings in which:

DETAILED DESCRIPTION

Figure 1:
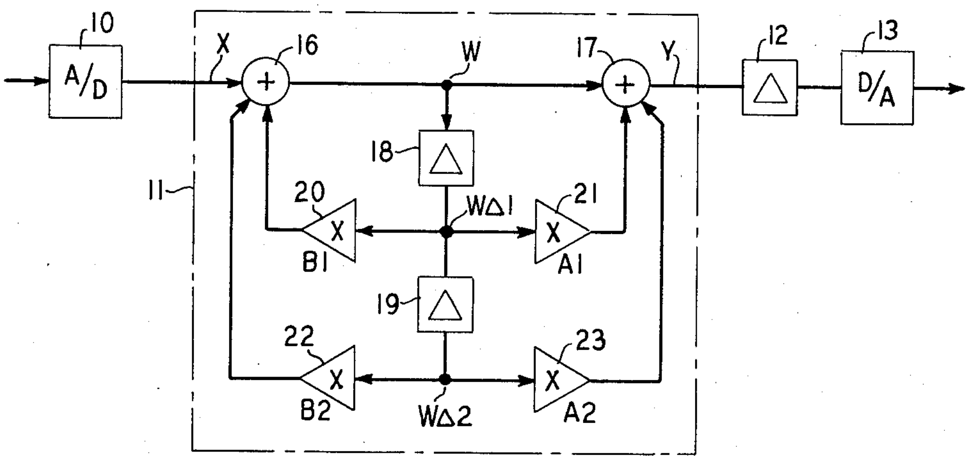
FIG. 1 (PRIOR ART)
FIG. 1 is a functional diagram illustrating a prior art technique for solving the problem to which the present invention is directed.

FIG. 1 functionally illustrates a prior art technique for digitally performing a predetermined function on an analog signal. For this purpose the analog signal is coupled through an analog-to-digital converter 10 to an input of a digital function circuit which is here illustrated as a digital filter 11. The filter output is coupled through a delay circuit 12 which advantageously represents a delay of one sampling period in the operation of the analog-to-digital converter 10. This delay 12 is inserted schematically in the signal path in FIG. 1 to represent the real-time delay for accomplishing the computations necessary to the operation of the digital filter 11. Delayed digital signals in the output of the delay circuit 12 are then transmitted through a digital-to-analog converter 13 prior to further transmission and utilization in the modified analog form.

The digital filter illustrated in FIG. 1 represents a classical design for a 2-pole-2-zero digital filter. Less complex filter forms can be utilized by simply omitting selected branches of the illustrated filter design. More complex filtering systems are advantageously achieved by adding filter sections in particular ways as will be subsequently described.

Digital signals X in FIG. 1 are applied at the filter input to one input connection of an adder 16. The adder output is here designated W and is applied to an input connection of a further adder 17 as well as being coupled through tandem-connected delay circuits 18 and 19. Each delay circuit accomplishes a delay corresponding to one sampling period in the analog-to-digital converter 10. The output of delay circuit 18 is the once-delayed form of the adder output W and is designated WΔ1. Similarly, the output of delay circuit 19 is the twice-delayed form of the adder output W and is designated WΔ2. The WΔ1 signal is applied to inputs of two multipliers 20 and 21 wherein it is multiplied by coefficients B1 and A1, respectively, prior to application to additional inputs of adders 16 and 17, respectively. In like manner the twice-delayed signal WΔ2 is multiplied by coefficients B2 and A2 in multipliers 22 and 23, respectively, prior to application to further inputs of adders 16 and 17, respectively. The output of adder 17 is a digital signal Y and is the modified digital representation of the input signal X.

Figure 2:
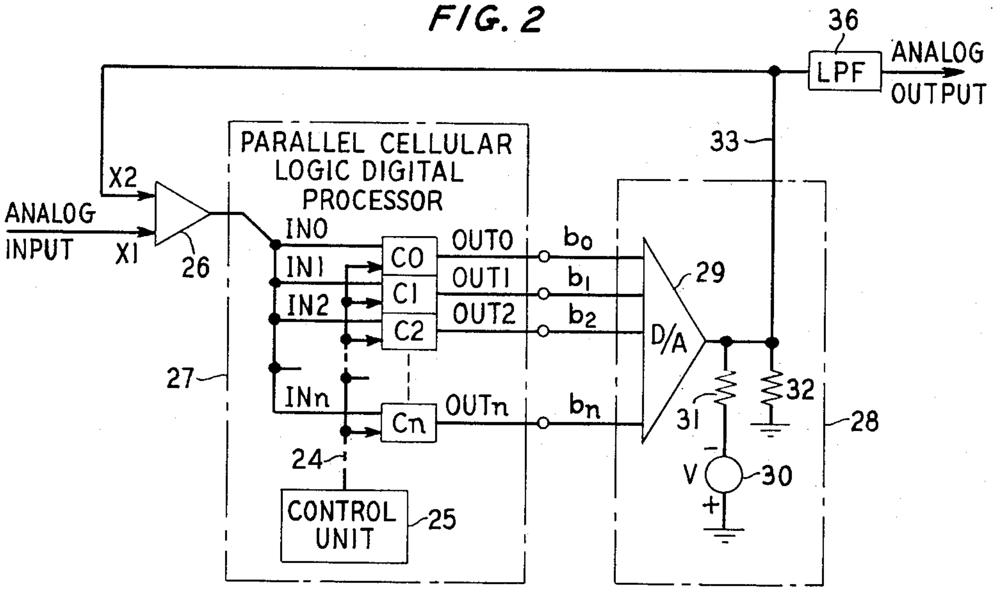
FIG. 2 is a simplified block and line diagram of a system for performing the functions of FIG. 1 but in accordance with the present invention.

In FIG. 2, the functions just outlined for the arrangement of FIG. 1 are accomplished in a combined hardware format wherein the analog-to-digital conversion and the separate digital function performed on the output thereof are accomplished in a common program flow of a digital processor. To this end, the same analog input signal which was provided to the converter 10 in FIG. 1 is supplied to one input connection X1 of a comparator circuit 26. Comparator 26 is of any of the well-known forms which are capable of comparing two analog input signals and providing an output signal which has a first voltage magnitude if the second analog input signal is larger than the first and has a second voltage magnitude if the second analog input signal is smaller than the first. This output from comparator 26 is applied to the input of a parallel cellular logic, digital processor 27. The comparator and processor cooperate with a digital-to-analog converter 28 for performing the analog-to-digital conversion and the desired digital function, i.e., digital filtering in the illustrative embodiment, all in the same program flow of the processor.

The term "processor," as employed in connection with processor 27, is intended to mean a machine or computer that is capable of performing with electrical signals manipulative logic — such as AND, OR, and EX OR — and arithmetic logic — such as addition and multiplication. Processor 27 is advantageously of the type described in U.S. Pat. No. 3,670,308 by D. M. Tutelman and as improved in accordance with a D. M. Tutelman application Ser. No. 175,477, filed Aug. 2, 1971, both of which are assigned to the same assignee as the present application. A processor of this type includes a plurality of substantially identical cells, and an illustrative cell will be hereinafter described in connection with FIG. 5. These cells are in FIG. 2 the cells C0, C1, C2. . . Cn. The cells are operated by a control unit 25 which supplies control signals in a cable 24 in accordance with a program that initially determines for each analog signal sample the digital representation of the sample amplitude. A successive approximation technique is employed for this analog-to-digital conversion. For that purpose, and for other digital processing herein considered, the processor 27 advantageously employs an 8-bit processing word. Consequently, processor 27 utilizes eight cells in FIG. 2. These particular sizes are merely illustrative.

Each of the cells in the processor 27 includes an input connection for receiving input signals from sources external to the processor. These input connections for the cells of FIG. 2 are designated IN0,IN1, IN2. . . INn and are all connected together to receive the output of comparator 26 in multiple. The cells each also includes a connection for providing signals to circuits outside of the processor and these circuits for the cells of FIG. 2 are correspondingly designated ϕUT0, ϕUT1, ϕUT2. . . ϕUTn. These cell outputs are coupled respectively to input connections *b0*, *b1*, *b2*. . . *bn* of a biased digital-to-analog converter 28 which operates to produce a corresponding analog output signal.

Converter 28 is represented by a converting impedance network 29 for coupling the aforementioned input connections to a bias circuit including a voltage source 30 and resistors 31 and 32. Converter output on a circuit 33 is coupled back to a second input X2 of the comparator 26. By properly selecting source voltage V and the resistances of resistors 31 and 32, the overall converter 28 is biased to operate in response to either positive or negative input signals. When bO. . .bn = 10000000, the voltage applied by circuit 33 to comparator input X2 is zero volts. An input condition *b0*. . .*bn* = 11111111 indicate maximum positive voltage, and *b0*. . .*bn* = 00000000 indicates maximum negative voltage. Intermediate voltages are represented by various corresponding binary numbers; and if the most significant bit is inverted, the numbers are in the twos complement form, which is advantageously employed for computations in processor 27.

Figure 3:
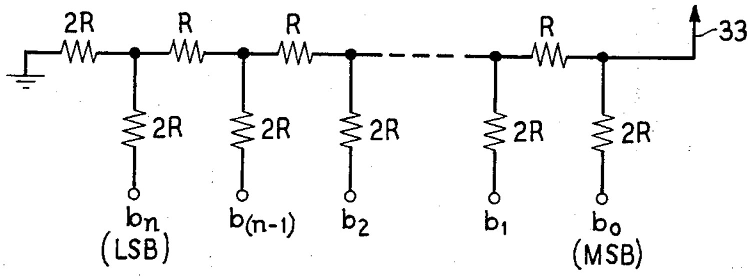
FIG. 3 (PRIOR ART)
FIG. 3 is a schematic diagram of a prior art digital-to-analog converter of the type indicated in FIG. 2.

In practice, the network 29 advantageously takes the form of a resistive type of network that is known in the prior art and that is illustrated in FIG. 3. This network includes a series string of resistors connected between the circuit 33 and ground. All of the resistors except the final one at the ground connection have a resistance R and that final grounded resistor has a resistance 2R. The circuit 33 is connected through a further resistance 2R to the input connection b0 in the most significant bit position. Each of the junctions between the series-connected resistors is similarly connected to a different one of the converter input connections in the input connection sequence until the junction between the grounded resistor 2R and its preceding resistor R is connected at the least significant bit position to the converter input connection bn.

As will subsequently be shown in discussion of the flow diagrams in FIGS. 7 and 8, an analog-to-digital convesion function is periodically carried out by cooperation of comparator 26, processor 27, and converter 28 for sampling the analog signal at comparator input X1. A successive approximation technique is employed utilizing all eight processor word bits starting at the most significant bit position. Each digital approximation is applied to connections *b0*. . .*bn* and the corresponding analog form coupled to comparator input X2. Now the new output of comparator 26 is examined in the cell of the bit position which had just been set to the binary ONE condition. If the comparator output indicates that the new approximation is higher than analog signal amplitude, the bit is set to the binary ZERO state; and the program continues to make a new approximateion at tbe next less significant bit position. However, if that first-mentioned approximation had been below the analog signal amplitude, the bit is left in the binary ONE state while the program continues to the next less significant bit position among the various processor cell positions.

The approximation testing routine just outlined is repeated until all of the eight bits in the processor have been established in appropriate binary conditions to represent in digital form the analog signal sample amplitude. Now the processor program outputs the filter computation results of a prior sampling time, i.e., sampling period $T_{i-1}$, through the digital-to-analog converter 28 and a low-pass filter 36 to the analog output circuit. At the same time that such output is available, processor 27 is making a new computation for the new sample time $T_i$ with the new digital sample that has just been ascertained.

Figure 4:
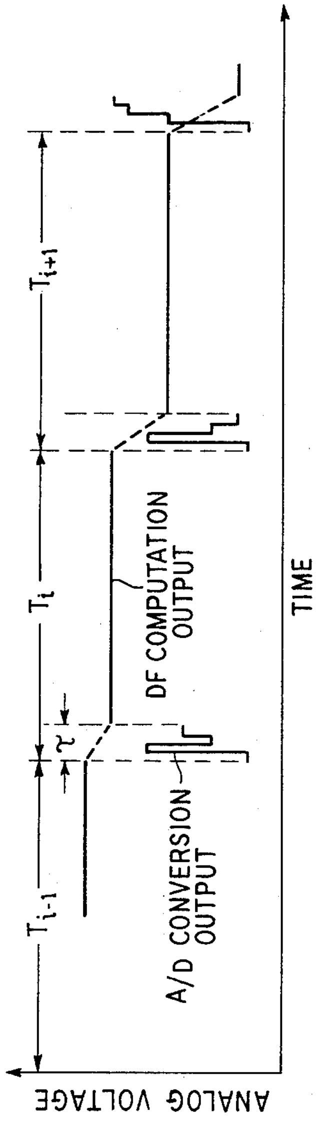
FIG. 4 is a set of waveforms illustrating the operation of the present invention.

As can be seen in FIG. 4, the analog-to-digital conversion output time $\tau$ is a relatively small part of each sampling period; and the digital filter output time consumes the remainder. Both outputs utilize circuit 33 and are available at the input to filter 36. Since only the filtered output is desired, filter 36 has a cut-off frequency below a frequency corresponding to $\tau/2$, but well above the bandwidth of the analog input signal. Since conversion time is a relatively small part of each sample period, the design of filter 36 has extremely relaxed requirements as compared to the requirements of the computed filter 11.

When a new digital filter computation has been completed for the sampling period $T_i$, the processor 27 holds the new computation results while awaiting the beginning of a new analog input sampling time $T_{i+1}$. At the latter time the analog-to-digital conversion and digital filter computation sequences are repeated once more for a new sample of the analog input signal.

Figure 5:
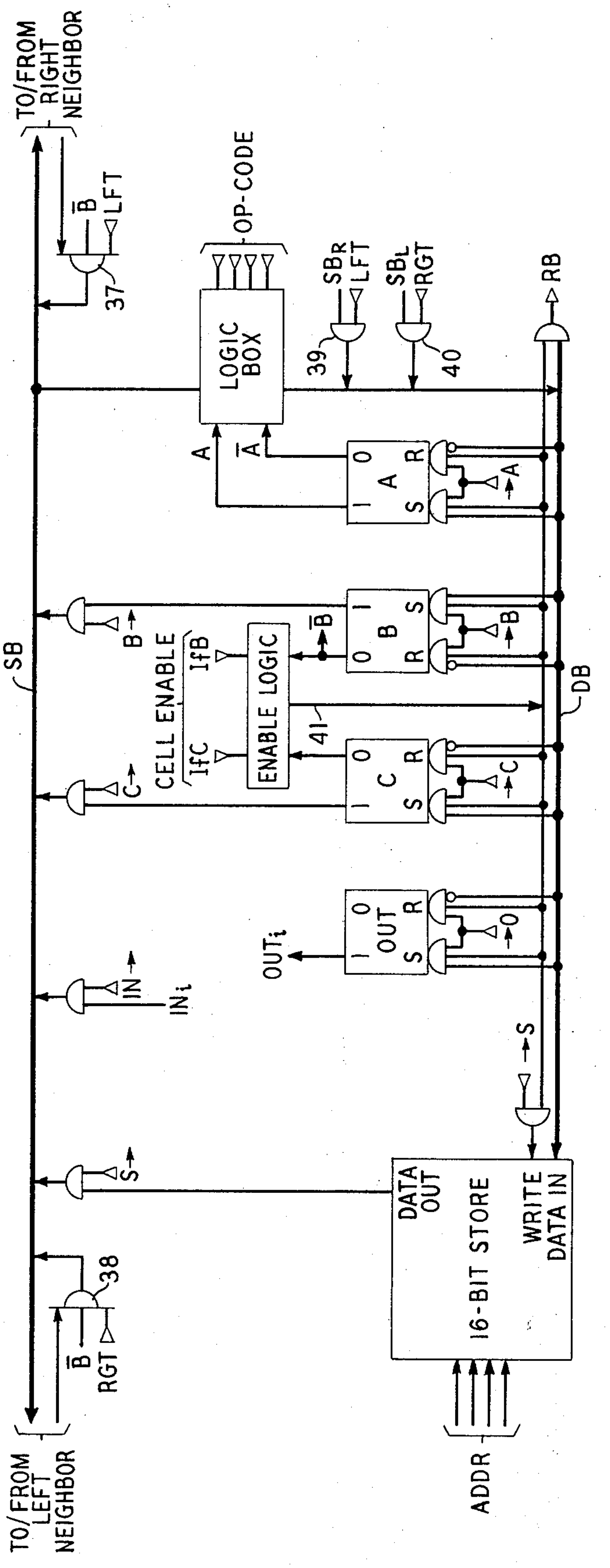
FIG. 5 is a simplified block and line diagram of a digital processor cell utilized in FIG. 2.

FIG. 5 is a greatly simplified block and line diagram of a single cell for a parallel cellular logic processor of the type taught in the aforementioned Tutelman improvement application No. 175,477. This simplified diagram is presented to facilitate an understanding of the operation of processor 27 in connection with the algorithm which will be described for performing the analog-to-digital conversion and the digital filtering functions in one program flow. The cell of FIG. 5 will be here briefly described in order to show the relation thereof to the present FIG. 2 and to the processor control unit 25 which provides control signals in parallel on cable 24 to all cells of the processor in accordance with microprogram instructions and which receives back from the cells only a signal on a read bus RB. Small triangular terminal indications on certain leads in FIG. 5 indicate leads included in cable 24. Mnemonic reference characters are utilized in FIG. 5 to facilitate association of the cell diagram with the program listing which will be subsequently presented as an implementation of the aforementioned algorithm.

In FIG. 5, the cell communicates with the outside world by way of a cell input circuit INi and a cell output circuit OUTi. The illustrated cell communicates with adjacent cells in global propagating, or marking, operations by way of a source bus SB. Global output signals from the cell are provided directly from the source bus to neighboring cell global logic. Global input signals from neighboring cells are received by way of global coupling gates 37 and 38 which allow the cell to receive at its source bus SB from a cell on the right or a cell on the left as determined by the control signals LFT or RGT, respectively, from the control unit. This global input communication is also dependent upon the binary state of a cell control bistable circuit B. More particularly, the bistable circuit B must be in the reset state to provide a B output signal at a gate-enabling voltage level in order to couple global input signals to the source bus SB. An additional global input to the cell is provided by way of further global coupling gates 39 and 40 from neighboring cell source buses to a destination bus DB of the cell illustrated in FIG. 5. Here again this communication is provided from the cell on the right by the LFT global control signal or from the cell on the left by the RGT global control signal. Apart from the aforementioned external communication circuits and global communication logic, all other cell input circuits extend from the processor control unit 25 by way of cable 24.

The cell of FIG. 5 employs four equally ranked control bistable circuits, or flip-flop circuits, A, B, C, and OUT. These bistable circuits, hereinafter simply designated "bistables," receive data signals from the destination, or result, bus DB when the bistable circuit input is selected by an appropriate control signal. For example, a control signal → A enables the input gates to the A bistable in each cell of processor 27 for receiving data signals from the destination bus DB of that cell. Binary ONE and ZERO output connections supply A and A signals from tbe bistable A to a logic box. That box is a universal logic element for coupling signals from the source bus SB to the destination bus DB in accordance with an appropriate logic operation selected by OP-CODE control signals from the control unit.

Control bistables B and C have the binary ONE outputs thereof extended to the source bus when control unit signals B → or C → , respectively, are available. Binary ZERO, outputs of the B and C control bistables are applied to ENABLE LOGIC for cooperating with condition control signals IfB and IfC, respectively. The ENABLE LOGIC provides a signal on a circuit 41 to control the utilization of destination bus signals as a function of the status of the B and/or C bistables.

A 16-bit store is also included in the cell of FIG. 5. When the → S control signal is present, the store receives data input signals from the destination bus DB at addresses specified by control signals ADDR from the control unit. Likewise, outputs are derived from the store at an address specified by the control unit for application to the source bus SB when an S → control signal is present.

Illustrative algorithms for performing addition and incrementing for a processor, such as the processor 27, are disclosed in the aforementioned Tutelman-477 improvement application. Likewise, instructions for global operation and for accomplishing transfers between various points in each cell, or in selected cells, are also described in that Tutelman application. These algorithms and operations are similarly utilized in the present application. In addition, a multiplication algorithm will also be herein described in connection with FIG. 9.

Figure 6:
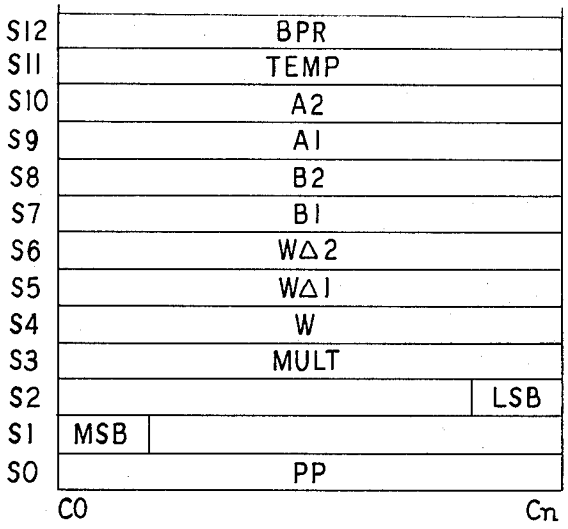
FIG. 6 is a diagram of memory allocation for FIG. 2 processor cells when executing a digital filtering algorithm.

In order to carryout the desired algorithm for performing two digital functions in a single program flow in each analog signal sampling interval, the previous example of an analog-to-digital conversion followed by a digital filter computation is again utilized illustratively for describing the program flow. In this illustrative example, the processor memory represented by the 16-bit stored in each of the cells is allocated, as indicated in FIG. 6, across a group of cells utilized for the program. Here the storage location S0 is reserved for the partial product PP of multiplication operations. Locations S1 and S2 contain masks wherein only one bit can assume the binary ONE condition. The mask in store location S1 contains a binary ONE in the most significant bit position, i.e., in the leftmost cell C0. Similarly, the store location S2 has a binary ONE in the least significant bit position, i.e., in the rightmost cell Cn. These two single-bit masks are utilized advantageously to mark the boundaries of a group of cells utilized for computations for a single digital filter section without requiring utilization of dedicated boundary cells. Store location S3 is reserved for storage of a multiplier word MULT for use in multiplication operations. Locations S4 through S10 provide storage for words representing the signals W, WΔ1, and WΔ2, and the coefficients B1, B2, A1, and A2, respectively, as shown in FIG. 1. Finally, the storage location S11 is reserved for use as a temporary storage register TEMP, and S12 is reserved for a multiplier bit postion register BPR to keep track of the multiplier bit position during multiplications.

Figure 7:
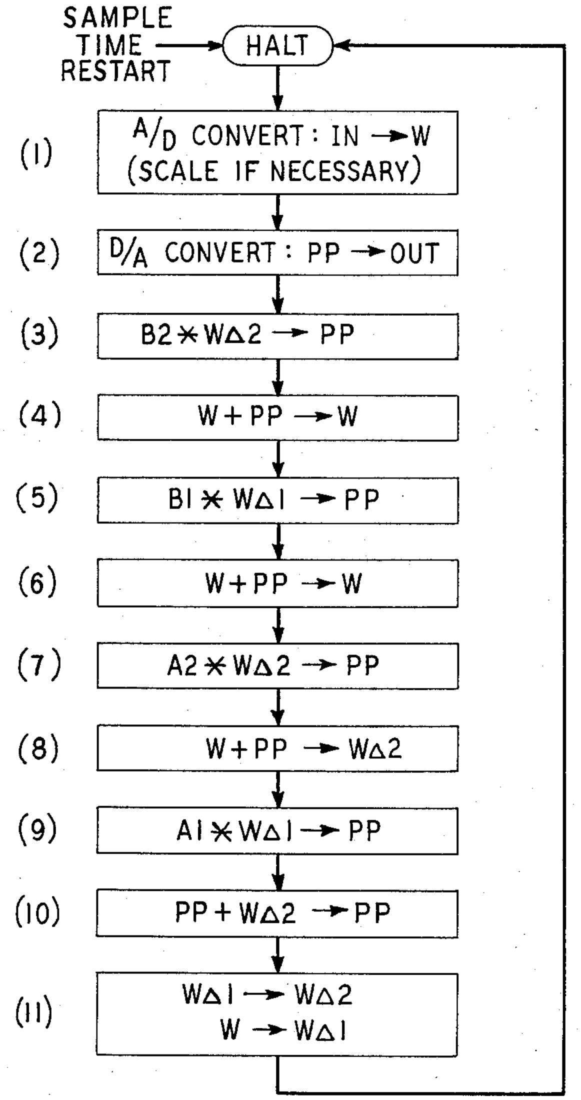
FIG. 7 is a flow diagram of a process for operating the system of FIG. 2 for digital filtering.
Figure 8:
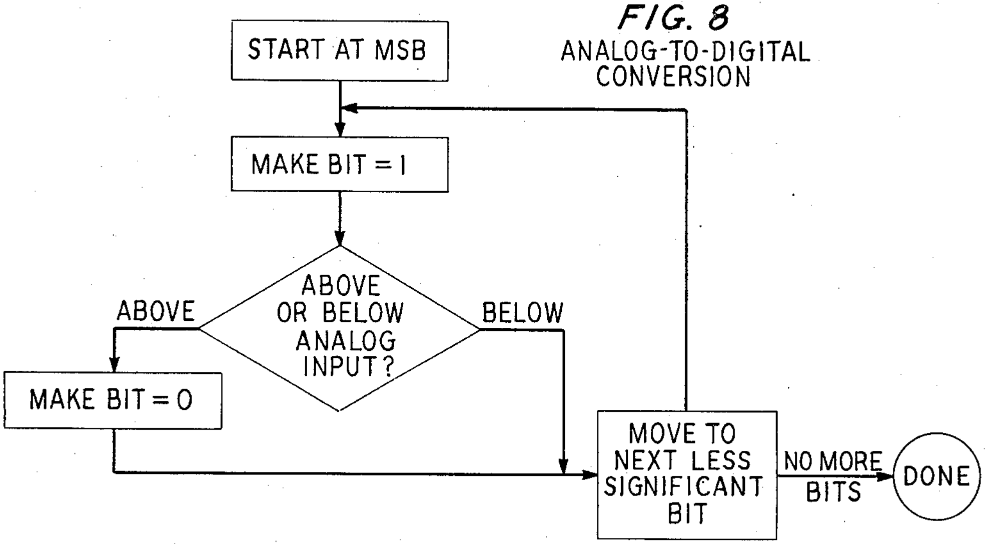
FIG. 8 is a flow diagram for an analog-to-digital conversion algorithm utilized in the process of FIG. 7.

FIG. 7 contains the overall flow diagram for processor program flow during a sampling period, such as the period $T_i$ in FIG. 4. The various blocks of the diagram are associated with Arabic numerals enclosed in parentheses and corresponding numeric indications are included in the program listing which will subsequently be presented, in order to facilitate association of the flow diagram blocks with corresponding program coding. Explanatory comments follow the coding for each block.

Instruction coding utilized as similar to that disclosed in the aforementioned Tutelman improvement application. Machine effects and machine-usable coding are essentially the same, and the corresponding programmer-usable form of coding is also much the same with a few exceptions. For example, global propagating instructions are programmer-coded here in the form RGT, C → A instead of C RIGHT TO A. Similarly, for conditional instructions the form utilized herein is IfC, S2 → instead of (CCON) S2 → . An instruction to enable the derivation of output from the cells is now in the form S4 → OUT instead of S4 → OUTPUT and complements are herein indicated in the form $\bar{A}$ instead of A'.

At the beginning of a sampling time, the processor is in a HALT state awaiting the beginning of the sampling time $T_i$. In this condition, the OUT bistable of the eight cells are providing on the eight output leads the 8-bit result of a digital filter computation previously performed for the sampling period $T_{i+2}$. The analog version of that result simultaneously is present on the circuit 33 in FIG. 2 and at the X2 input to the comparator 26, but the corresponding comparator output signal is ineffective at the moment because the processor 27 is not at that time specifically reading in the output of the comparator. The same analog output from circuit 33 is, of course, simultaneously coupled through the low-pass filter 36 to the analog output.

Coding for the block (1) analog-to-digital conversion of the FIG. 7 flow diagram is as follows and conforms to the conversion flow diagram of FIG. 8:

1. Input A/D Conversion → W

```
WAIT: HALT
      O → S4
      S1 → C
      1 → B

INPUT: IfC, 1 → S4-
      S4 → OUT
      IfC, IN → S4

      IfC, S2 →        (LBFF)
      RGT,C → A
      A → C
      BRO INPUT

      S1 → C
      IfC, S4 → A
      IfC,A → S4

Scale Input (if necessary)
      RGT,S4 → A
      IfC,S4 → A
      A' → S4
```

The foregoing coding resets the W register S4 to the all-ZERO state and puts the most significant bit (MSB) mask (S1) into the C control bistables of all cells to initiate a digital approximation of the analog signal. Also, a binary ONE is inserted into each B control bistable so that the $\bar{B}$ output is low for inhibiting global propagation to no more than one cell at a time. That is, global gates 37 and 38 in FIG. 5 are disabled, but global gates 39 and 40 can be operated. At the INPUT instruction of the program, the single cell where in the C bistable is set has a binary ONE stored in the W register S4; and the contents of S4 in all of the eight participating cells, i.e., the initial digital approximation, are transferred to the OUT bistables. Now a new processor input (based upon the output of comparator 26 in response to the analog representation of the contents of the OUT bistables) is stored in S4 of only the C-marked cell to make the state of S4 in that cell conform to the latest approximation of the analog signal.

A test is performed to see if the program has progressed to the least significant bit (LSB) position of the digital approximation; and the read bus RB is activated when the C-marked cell and the contents of S2, tbe LSB mask, in the same cell are both in the binary ONE state. If so, a parenthetical instruction (LBFF) allows a branch control bistable circuit (not shown) in the control unit 25 to be set so that the program address counter is able to exit from the analog-to-digital conversion loop when a branch on ZERO (BRO) instruction is reached. Following the test, the contents of the C bistables are right-shifted to the A control bistables of adjacent cells; and then the contents of those A bistables are transferred to the respective C bistables of the same cells. Now only one cell, that one in the cell next to the MSB position, will have its C bistable set in the binary ONE state because the propagation was limited to a range of one cell. If the test had left RB low and the branch bistable reset, the program now loops back to INPUT to repeat; and the new C bistable status initiates a new digital approximation.

Assuming that the aforementioned test had found that the C-marked cell was in the LSB position, the BRO INPUT instruction produces no looping, and the analog-to-digital conversion is complete. The program advances to a segment for converting the contents of W register S4 to 2s complement notation. This latter action is accomplished by putting the original MSB mask from S1 into the C control bistables and then, where C is set, transferring the contents of the W register S4 to the A control bistables and thereafter transferring the complement of the contents of the A bistable in the C-marked cell back to store location S4. This inversion makes the S4 MSB into the sign bit and effects the 2's complement notation as earlier described.

At this point, a "scale input" optional segment of coding can be included in the program if it is known that the analog signal sample must be scaled to a format suitable for utilization in the rest of the program. Typically, the programmer must include in the program a suitable number of repetitions of the illustrated scaling coding to accomplish the desired adjustment. Assuming that the order of analog input magnitudes is greater than the fractional order to be used in processor 27, each order of scaling is achieved by right-shifting the contents of the W register S4 one position, reestablishing the sign information in the MSB position of the shifted information, and returning the total result to S4.

(2) Output Last Computed Value from PP

PP → A
IfC,A → PP
PP → OUT

The result of a prior sampling period digital filtering computation, if any, was left in the PP register S0. It is now transferred by the foregoing coding to the A control bistables. The most significant bit, as signified by the MSB mask which is still in the C bistables, is inverted to converter from the 2s complement form back to the form of binary representation utilized by digital-to-analog converter 28 as already described. The digital signal is then transferred to the OUT bistables to be available through the digital-to-analog converter 28 and low-pass filter 36 as the analog signal output.

(3) B2*WΔ2 → PP
S8 → S3
BIT1: RGT, S6 → A
S1 → B
IfB, S6 → A
A → So
S2 → A
A·S3 → C
LFT, C → A
A+C → C
IfC, o → S0
RGT, B → S12
1 → B
BIT2: RGT, S3 → A
A → S3
S1 → B
A·S2 → C
LFT, C → A
A+C → S11
$\overline{S6}$ → A
$\overline{A}$·S0 → C
If B, 0 → C
A·$\overline{S0}$ → A
A+S1 → B
LFT, C → A
A⊕S6 → C
C → A
A⊕S0 → C
S11 → B
IfB, C → S0
1 → B
RGT, S0 → A
S1 → C
IfC, S0 → A
A → S0
RGT, S12 → A
A → S12
A·S2 → (LBFF)
BRO BIT2
BIT8: RGT, S3 → A
S1 → B
A·S2 → C
LFT, C → A
A+C → S11
S0 → A
A·S6 → C
IfB, 0 → C
$\overline{A}$·S6 → A
A+S1 → B
LFT, C → A
A⊕S0 → C
C → A
A⊕S6 → C
S11 → B
IfB, C → S0

The preceding coding multiples the coefficient B2 times the twice-delayed version of the signal W and places the resultant in the partial product register S0. In the multiplication algorithm utilized herein each bit of the multiplier MULT, proceeding from LSB to MSB, is examined. If it is a ZERO tbe PP is right-shifted before proceeding, but if it is a ONE the multiplicand MPC is added to the previous partial product and the sum right-shifted and stored in the PP register before proceeding. MULT is right-shifted one position and the routine of examining the new LSB of MULT is reinitiated. If the MSB has been reached, and if it is a ZERO, the previously determined partial product PP is the final result of the multiplication. If the MSB is a ONE, the difference between MULT and that previous partial product is the final product.

Figure 9:
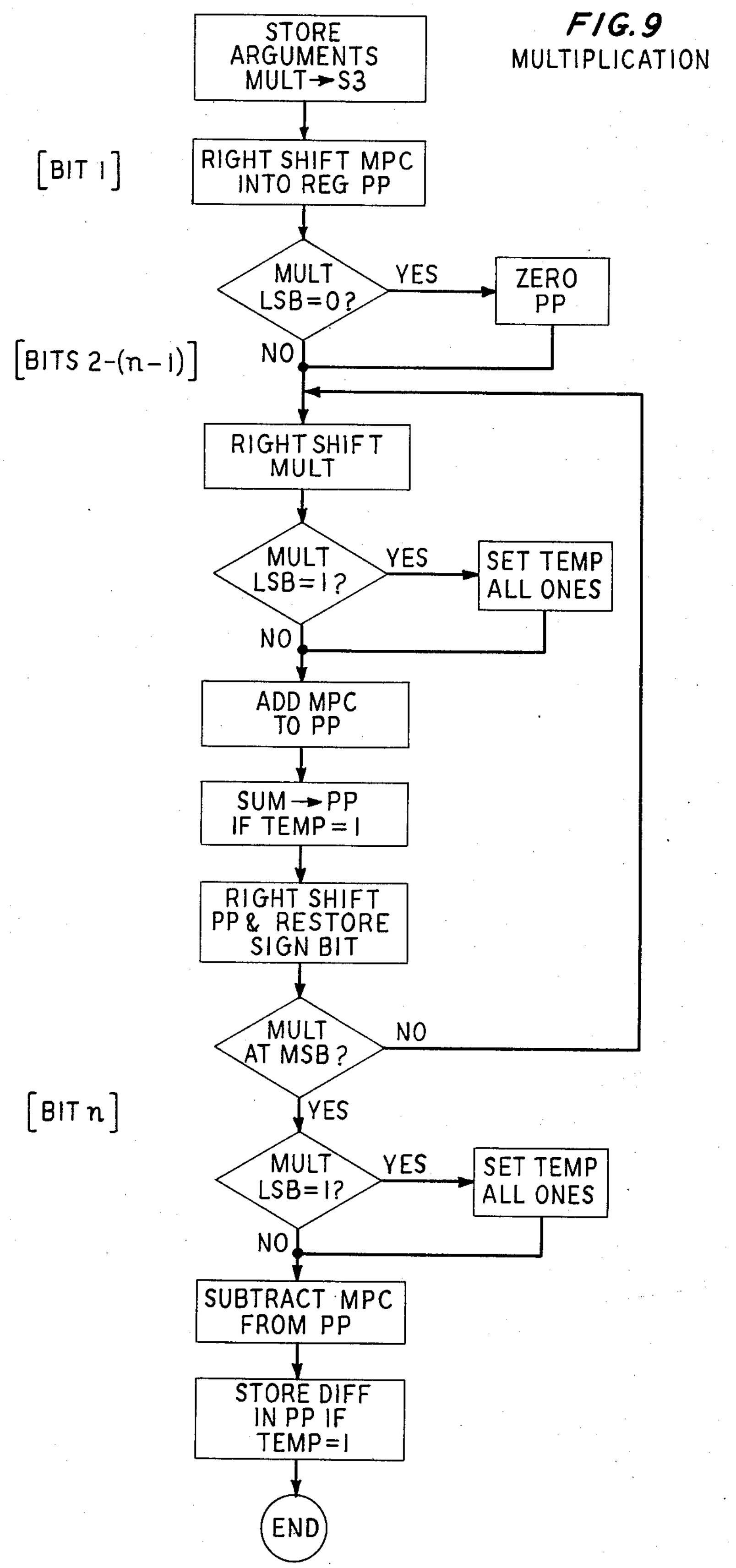
FIG. 9 is a flow diagram for a multiplication algorithm utilized in the process of FIG. 7.

The general multiplication algorithm just outlined is utilized in the foregoing coding for the FIG. 7 flow diagram block (3) as diagrammed in FIG. 9. Initially the binary representation of the coefficient B2 is transferred from the register S8 to the MULT register S3.

At the instruction BIT1, a twice-delayed form of the signal W in the WΔ2 register S6, is right-shifted one position into the A control bistables. The MSB mask in S1 is transferred to the B control bistables (removing the one-cell limit on global operations), and the MSB from register S6 is again transferred to the A bistables to restore the sign bit in the right-shifted form of WΔ2. In that form, WΔ2 is then transferred from the A bistables to the PP register S0.

The partial product PP is ZEROed when LSB of MULT is ZERO by ANDing the LSB mask S2 with the complement of MULT register S3 into the C control bistables. Thus, the C bistable in the LSB cell position is set if the LSB of the multiplier had been a ZERO and it is left reset if not. However, all other C bistables are in the reset state. The state of the C bistable is propagated to the left into the A control bistables of adjacent cells and thereby sets all other A bistables if the MULT LSB had been ZERO. Now, the contents of the A and C bistables are ORed into the C bistables so that all Cs are now set if the MULT LSB had been ZERO. A conditional instruction IfC allows the writing of ZERO into the PP register S0 where C is set. Thus, the PP register is ZEROed if the MULT LSB had been ZERO. Had that LSB been a binary ONE, all C bistables would have been ZEROed when the LSB mask was ANDed with the complement of MULT; the global instruction LFT, C → A would have reset all A bistables, which in turn would leave all C bistables reset; and the conditional instruction would then have left the shifted partial product unchanged.

Another global instruction RGT, B → S12 initializes the BPR register S12 with the MSB mask.

Since the B control bistables were utilized in the second instruction after the BIT1 instruction, they are now all set to the binary ONE condition to limit global propagation at the outset of the next multiplier bit operation.

At the instruction BIT2, the multiplier, i.e., the coefficient B2, is right-shifted one position and returned to tbe storage location S3. This makes a new bit available for examination as the least significant bit.

The MSB mask S1 is transferred to the B bistables as a prelude to setting the TEMP register if the multiplier LSB is a binary ONE. The shifted MULT, which is still in the A control bistables, is transferred through the LSB mask into the C bistables so that the C bistable in only the LSB cell can be set (all other C's are reset) and even there only if the multiplier LSB is a binary ONE. The state of the C bistable in the LSB cell is propagated to the left into the A bistables of adjacent cells and thereafter ORed with the new state of the A bistables into the TEMP register S11.

A complement of the multiplicand contents WΔ2 register S6 is transferred to the A bistables and then the complement of A is ANDed with the previous PP, in register SO, into the C bistables to mark CARRY generators in an addition algorithm. Double complementing is utilized here to faciliate subsequent marking of CARRY annihilators in the same A bistables later without using a prohibited $\bar{A}$·SO → A instruction. That type of instruction is prohibited because of a possible instability in the A bistable if its inverted output is used to control its state. A precautionary instruction IfB, O → C resets C in the MSB cell to prevent a carry from propagating into the LSB cell of an adjacent cell group. Now, the true form of the A bistable contents in ANDed with the complement of the previous partial product in register S0, and the result is coupled into the A bistables to mark CARRY annihilators. The same result is also ORed with the MSB mask into thb B bistables. The latter operation limits CARRY propagation from C-marked CARRY generators so that propagation must stop at the most significant bit position if there are other cell groups in the processor that are not involved in the computations of this particular cell group. Subsequently, two Exclusive/OR operations are carried out to complete the algorithm for adding the first multiplier to the prior partial product. The resulting form is the new partial product, and it is transferred to the PP register S0 only if the TEMP register had been set in the all ONE condition by finding a binary ONE in the LSB of the shifted multiplier.

The new partial product is now right-shifted one place and the sign bit reestablished in the most significant bit position.

The preceding coding from the instruction BIT2 is repeated for bit 3 through bit 7 by a shifting-flag segment of coding similar to that utilized in the block (1) coding to effect the bit-by-bit progression of successive approximations for the analog-to-digital conversion. However, in the present case the BPR storage register S12 is provided in the cell, and it is used to half the looping after the MULT bit 7 has been utilized in the multiplication routine. The MSB mask in MBP register S12 is right-shifted one bit position at the end of each BIT2 coding segment and ANDed with the LSB mask to energize the read bus RB when the mask bit is shifted into the LSB position. Now failure of the branch-on-ZERO operation allows the program to step on to the BIT8 instruction. As an alternate to the shifting-flag technique, a counter could be established in the store of one of the cells and incremented as discussed in the Tutelman improvement application to determine when to move on to BIT8.

Instruction BIT8 begins a coding segment wherein the TEMP register S11 is again set depending upon the binary state of tbe shifted multiplier LSB, which bit is now also the MSB, or sign bit, of the unshifted multiplier. In this segment, the right-shifted multiplier is not restored to location S3 because that form of the multiplier is no longer needed. Since bit 8 is the most significant bit of the multiplier, it is also the sign bit in the 2s complement notation. Since 2s complement fractional multiplication was utilized in the foregoing multiplication, the final operation with respect to tbe sign bit would normally involve testing the bit to determine whether or not it is a binary ONE and, if it is, subtracting the multiplicand from the partial product. However, in the parallel cellular logic processor herein employed, the cells are normally controlled by a microprogram stored in a read only memory. Consequently, it is not convenient to perform the sign test with a subsequent program branching operation because the test result may be different in different groups of cells which are operating in parallel in response to the same program. Therefore, the coding involving the most significant multiplier bit first performs the indicated subtraction and then does a conditional storing operation of the difference depending upon the state of the TEMP register S11. The subtraction routine will be recognized as the usual addition routine performed on the complement of the partial product in register S0.

(4) W+PP → W
S4 → A
A·$\overline{S0}$ → C
S1 → B
IfB, 0 → C
A·$\overline{S0}$ → A
A+S1 → B
LFT, C → A
A⊕S4 → C
C → A
A⊕S0 → C
C → S4

In this segment of coding, the new partial product, derived from block (3) and representing the product of twice-delayed form of W and the coefficient B2, is added to the original input signal now residing in W register S4. The adding operation is of the same type that was used subsequent to the instruction BIT2 in the coding for block (3). The resulting sum is stored back in the W register S4.

(5) B1*WΔ1 → PP

An instruction S7 → S3 is utilized to transfer the coefficient B1 into the MULT register S3. Thereafter, the coding segment of block (3) is repeated utilizing store location S5(WΔ1) instead of store location S6(WΔ2) for the multiplicand.

(6) W+PP → W

Here the block (4) coding is utilized for adding the new partial product obtained in the block (5) operations to the revised W signal produced as a sum in the block (4) operations. The new sum is stored in the W register S4.

(7) A2*WΔ2 → PP

An instruction S10 → S3 is utilized to transfer the coefficient A2 into the multiplier register S3. Thereafter, the block (3) coding is repeated.

(8) W+PP → WΔ2

In this block, coding such as was employed in block (4) for performing addition is utilized for adding the signal W, as modified by the B1 and B2 feedbacks, to the partial product derived by the operations of block (7). The sum is placed in the WΔ2 register S6, instead of the W register S4, because the WΔ2 signal format is no longer needed in the present sampling time. This leaves the contents of the W register S4 available for use in the next sampling period since W becomes WΔ1 for that period.

(9) A1*WΔ1 → PP

An instruction S9 → S3 transfers the coefficient A1 into the multiplier register S3. Thereafter, the coding of block (3) is repeated using the location S5(WΔ1) instead of the location S6(WΔ2) for the multiplicand.

(10) PP+WΔ2 → PP

In this block, the same type of addition coding employed in block (4) is utilized to add the partially modified output of the second adder 17 (the result signal that was stored in the WΔ2 register S6 after the block (8) operations) to the partial product from the block (9) operation and store the new partial product in PP register S0.

(11) WΔ1 → WΔ2
S5 → A
A → S6
W → WΔ1
S4 → A
A → S5
TRA WAIT

Modified signal representations are stepped to different signal registers for use in the next sampling period. Thus, the once-delayed form of the signal W (contents of location S5 unchanged from the start of the sampling period) is moved to storage location S6 to be utilized as the twice-delayed form of W signal. Similarly, the W signal (as just modified by the B1 and B2 feedbacks and stored in locationS4 at the end of tbe block 6 coding) locations S4 the once-delayed signal WΔ1 in register S5. The program now transfers to the instruction WAIT at the start of the box 1 operation.

The foregoing program listing includes approximately 830 instruction times for accomplishing both the analog-to-digital conversion and the digital filtering computation for the circuit of FIG. 2. A parallel cellular logic processor of the type disclosed in the aforementioned Tutelman improvement application typically operates on a 100 nanosecond clock period and executes a new instruction in each clock period. Thus, the total program just outlined requires approximately 83 microseconds for complete execution. In an illustrative application a digital filtering computation is performed for a voiceband, electrical signal, i.e., a signal having a bandwidth of approximately 4 kHz and an 8 kHz Nyquist sampling rate. Since a sampling period in such an arrangement extends for 125 microseconds, there is ample time for completing the aforementioned program. The total program takes about 65 percent of each period and the block (1) coding including the analog-to-digital conversion takes only about 6 percent of a period, assuming no scaling.

Figure 10:
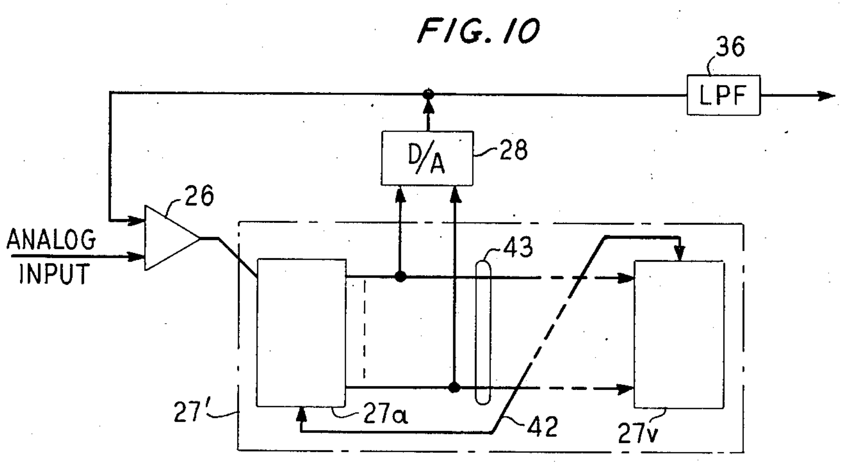
FIG. 10 is a diagram illustrating the application of the present invention to a filtering system employing a plurality of filter sections.

FIG. 10 is a simplified block and line diagram of an extension of the invention, as represented in FIG. 2, to an application which utilizes plural cell groups, or sections, coupled in tandem for implementing a filter having more than two poles and zeros. The processor 27′ in FIG. 10 includes a tandem sequence of plural cell sets 27*a* through 27*v*, where *v* represents in general any number which is appropriate to the described application. Each set of cells includes a plurality of cells C0 through Cn as in FIG. 2.

The processor input lead from the output of comparator 26 is connected in multiple to input connections of all cells of the set 27*a*. Output connections of cells in the same set are connected to respective inputs of the digital-to-analog converter 28, as already described in connection with FIG. 2. Those same output connections are further extended by circuits 43 to the next set of cells in the tandem sequence. Thus, the ϕUT leads of each set of cells go directly to the IN leads of the next set of cells in the sequence.

A circuit 42 schematically represents the bidirectional interconnection of source buses among cell groups in the same manner that such buses for the respective cells are interconnected within a group. In the arrangement shown in FIG. 10, it is assumed that the circuit 42 interconnects the source bus of the least significant cell position in the next succeeding group of cells in the sequence of the processor 27′ from set 27*a* to set 27*v*.

The operation of FIG. 10 is basically in accordance with the process diagram of FIG. 7. Two modifications are required to accommodate the cooperation among cell sets for transferring information from set to set. A first modification involves the addition of a block (0) (not shown in the drawing) to the FIG. 7 process just prior to block (1). In block (0) the contents of the PP register S0 in last cell set 27*v* are propagated to the TEMP register S11 in the first cell set 27*a*, the subsequently output to the digital-to-analog converter. Similarly, the contents of all other PP registers are transferred to the TEMP register of the next set in the sequence, to be subsequently treated as the input value to that set. Block (1) is then executed in all cells for doing the analog-to-digital conversion as already outlined with respect to FIG. 2. The conversion is effective in only the cell set 27*a*. Other cell sets run through the same conversion program steps at the same time, but they produce no output results because they simply drive each other (or nothing in the case of the cell set 27*v* ). At the end of analog-to-digital conversion a substitute block (2′) is executed to output the contents of the TEMP register in cell set 27a to the digital-to-analog converter and to transfer the contents of all other TEMP registers into the W (input) register S4 of the same cell set. Now blocks (3) through (11) of FIG. 7 are executed simultaneously in all cell sets. Coding for the two modifications, i.e., blocks (0) and (2'), is hereinafter discussed.

(0) $PP_{Last} \rightarrow TEMP_{First}$
$PP \rightarrow TEMP_{Next}$
1 → B
LFT,B → A
$\bar{A}$ → S12
0 → B
RGT,S2 → A
$\bar{A}$ → C
IfC, S2 → A
IfA, 1 → S12
TRNSF S12 → B
IfB,S0 → C
LFT,C → A
IfB, A → S11
IfB, S1 → (LBFF)
1 → B
LFT,S12 → A
A → S12
BR 0 TRNSF
0 → B
RGT,S2 → C
S0 → OUT
IfC,IN → S11

The first four coding segments perform the $PP_{Last} \rightarrow TEMP_{First}$ part of this block for propagating the contents of PP register S0 in set 27v to TEMP registers S11 in set 27a. The first two of those segments set flags in the LSB stage in the registers S12 of sets 27a and 27v only. The latter operation allows a shifting flag sequence to be carried out for monitoring the aforementioned propagation. Initially all B bistables are set and their states propagated to the left into A bistables to leave only the A bistable in the LSB cell of set 27v reset. The condition of the latter bistable is then inverted and transferred into S12 to set only the LSB stage there. This is the first of the two flags. To establish a similar flag in set *27a*, tbe B bistables are all reset, and the LSB mask (S2) bits are propagated to the right into A bistables. This leaves all A bistables in 27a reset, and tbey are used to C mark the same cells. Now two conditional instructions transfer the LSB mask into A bistables in set *27A*, and allow the setting of the LSB stage of S12 in the same set without clearing the S12 flag previously set in *27v*.

In the TRNSF coding segment, the partial product from cell set *27v* is moved to set *27a* a bit at a time. The S12 flags are placed in the B bistables and a conditional instruction sets the C bistable of flagged cells according to the corresponding partial product bit. Now the global instruction propagates that bit left to the A bistable in the flagged cell of set 27a where it is transferred to the TEMP register S11.

A shifting flag test now determines whether or not the most significant bit position has been reached and shifts the flag bits one position to the left. If the MSB position has not been reached, the program loops back to TRNSF; and if the MSB has been reached, the operation jumps out of the loop.

Finally, it is necessary to transfer the partial product of each cell set to the TEMP register of the next set in the tandem sequence without disturbing the TEMP register S11 in set *27a*. All Bs are reset to allow propagation, and the LSB mask (S2) is propagated right into C bistables for setting the C bistables in all cells except those of set 27a. Contents of all PP registers S0 are transferred to OUT bistables, and a conditional instruction allows the coupling of the states of those bistables to TEMP registers S11 in all sets except *27a*.

(2')TEMP → OUT
$TEMP_{(Not\ 27a)} \rightarrow W$
S11 → OUT
0 → B
RGT,S2 → C
S11 → A
IfC,A → S4

In this segment, the final filter computation results are made available to the digital-to-analog converter at set *27a*, and in other sets the contents of TEMP registers are placed in the W registers S4 to be available for a new computation. The transfer from S11 to OUT accomplishes the former result. Next all cells, except in set *27a*, are C-marked. Contents of register S11 are transferred to the A bistables, and a conditional instruction for C-marked cells accomplishes the desired loading of W registers S4.

Although the present invention has been described in connection with particular embodiments and applications thereof, it is to be understood that additional embodiments and applications, which will be obvious to those skilled in the art, are included within the spirit and scope of the invention.

What is claimed is:

1. In combination, means for comparing magnitudes of a first analog signal and a second analog signal and producing a result signal indicative of the relative magnitudes of such signals, means for processing signals in accordance with a predetermined program, said processing means having an input connection and having a plurality of output connections at which digital signal representations of the signal processing results are presented, said processing means comprising means for performing first and second digital operations in first and second parts of each of plural recurrent time intervals with respect to said first analog signal, said first and second parts being of unequal durations, means for coupling said result signal from an output of said comparing means to said input connection, means, connected to said processing means output connections, for converting a digital signal representation to a corresponding analog signal representation thereof, an output circuit, said output circuit including passive signal filter means having transmission characteristics selected for suppressing analog signal effects in one of said time interval parts of each interval as compared to analog signal effects in the other part, and means for coupling said analog signal representation simultaneously to said comparing means as said second analog signal and to said output circuit.

2. In combination, means for comparing magnitudes of a first analog signal and a second analog signal and producing a result signal indicative of the relative magnitudes of such signals, means for processing signals in accordance with a predetermined program, said processing means having an input connection and having a plurality of output connections at which digital signal representations of the signal processing results are presented, said processing means comprising a parallel cellular logic processor, means for coupling said result signal from an output of said comparing means to said input connection, means, connected to said processing means output connections, for converting a digital signal representation to a corresponding analog signal representation thereof, an output circuit, and means for coupling said analog signal representation simultaneously to said comparing means as said second analog signal and to said output circuit.

3. The combination in accordance with claim 2 in which said processor comprises means, responsive to said result signal and operative in an initial part of each of plural analog signal sampling periods, for performing a first computational function to form at said output connections a digital representation of the magnitude of a sample of said first analog signal, and for thereafter performing a second computational function on said digital representation of such sample to form at said output connections a predetermined modification of said digital signal representation.

4. The combination in accordance with claim 3 in which said output circuit comprises a passive low-pass filter having cutoff frequency selected so that signals in said initial part of the sampling period are substantially suppressed as compared to signals in the remainder of said sampling period during transmission through said output circuit.

5. The combination in accordance with claim 2 in which said processor comprises a plurality of computational cells of substantially identical format and each including a controllable input circuit and a controllable output circuit, said cells being arranged into a predetermined plurality of plural-cell groups, means for coupling said groups in a tandem sequence in which cell output circuits of each group, except the last in said sequence, are connected to cell input circuits, respectively, of the following cell in said sequence, means for connecting said processor input connection in multiple to cell input circuits of the first cell group in said sequence, means for connecting the cell output circuits of the first cell group in said sequence as said processor output connections to said converting means, and means for interconnecting all of said cells in a global propagation sequence for controllably propagating signals from cell to cell.

6. In combination, an analog signal input circuit and an analog signal output circuit, means for comparing analog signal magnitudes and producing a two-valued output signal indicative of which compared signal is the larger, means for connecting said signal input circuit to supply a first analog signal to said comparing means, a parallel cellular logic processor comprising a programmed control unit and at least one group of processing cells all connected to receive the same control signals from said control unit, said processing cells having digital signal output circuits, means for connecting said comparing means output signal to all cells of said group, means, connected to receive signals from a group of said cell output circuits, for converting a plurality of digital input signals into a corresponding analog output signal, means for connecting said corresponding analog output signal to both said analog signal output circuit and an input of said comparing means, and means, in said control unit, for operating the last mentioned cell group in a program for periodically sampling said analog signal input circuit through said comparing means and computing a corresponding digital representation of an analog signal sample so obtained, said operating means further operating the same cells in a program, in each sampling period, for computing an least one predetermined modification of said sample for application to said digital signal output circuits.

7. The method of converting and digitally filtering an analog electrical input signal in a signal mode converting and digital filtering circuit, comprising the steps of

1 coupling to a first input of a comparator circuit the analog input signal,

2 sampling the comparator output signal at least at the Nyquist rate for the signal at inputs of a multi-cell, parallel cellular logic, digital processor circuit,

3 producing on plural outputs of said processor circuit an approximation of the analog input signal in the form of multi-bit binary signal,

4 converting the binary approximation signal into an analog representation in a digital-to-analog conversion circuit,

5 feeding back the analog representation of tbe binary approximation signal to a second input of said comparator circuit,

6 in said processor circuit correcting each bit of the binary approximation signal in accordance with the value of the comparator output signal until the corrected binary signal approximates the analog input signal to an accuracy corresponding to the value of the least significant bit in the binary signal,

7 digitally filtering the final version of the binary approximation signal in said processor, and

8 during substantially all of the sampling period in which the analog input signal is digitally filtered and subsequent to the final digital approximation thereof, producing on the plural outputs of said processor circuit the multi-bit digital result of the digital filtering that occurred during the prior sampling period.

8. The method of digitally filtering an analog electrical input signal in a signal mode converting and processing circuit, comprising the steps of

1 sampling the analog input signal at the input of said circuit, said sampling being repeated at least at the Nyquist rate for the signal,

2 converting the analog input signal in said circuit into a multibit digital approximation of the signal,

3 digitally filtering the digital approximation in said circuit during the same sampling period and following the conversion of the input signal, and

4 during substantially all of the last mentioned period and subsequent to the conversion portion thereof, producing as the output of said circuit the result of the digital filtering of a prior sampling period.

* * * * *